United States Patent [19]
Celii

[11] Patent Number: 5,956,148
[45] Date of Patent: Sep. 21, 1999

[54] SEMICONDUCTOR SURFACE MEASUREMENT SYSTEM AND METHOD

[75] Inventor: Francis G. Celii, Dallas, Tex.

[73] Assignee: Texas Instruments Incorporated, Dallas, Tex.

[21] Appl. No.: 08/989,904

[22] Filed: Dec. 12, 1997

Related U.S. Application Data

[60] Provisional application No. 60/034,258, Dec. 20, 1996.

[51] Int. Cl.$^6$ .................................................. G01J 4/00
[52] U.S. Cl. ............................................................ 356/369
[58] Field of Search .................................... 356/364, 367, 356/368, 369, 381, 382, 72–73, 351, 355, 357, 243, 399–401, 375, 376; 250/225; 117/200–202

[56] References Cited

U.S. PATENT DOCUMENTS

| | | |
|---|---|---|
| 5,408,322 | 4/1995 | Hsu et al. . |
| 5,501,637 | 3/1996 | Duncan et al. . |
| 5,513,948 | 5/1996 | Bacchi et al. . |
| 5,556,465 | 9/1996 | Levola . |

*Primary Examiner*—K P Hantis
*Attorney, Agent, or Firm*—Mark A. Valetti; Carlton H. Hoel; Richard L. Donaldson

[57] ABSTRACT

A semiconductor surface measurement system (100) is disclosed. In this system, a plurality of wafers (106), each having an exposed surface, are held by a wafer positioning system (104), which sequentially moves the wafers into a measurement zone. A wafer position detection system (124) detects the position of a selected wafer, and generates an output signal indicating the position of the selected wafer. A surface measurement apparatus (114 through 121, 130 through 142) measures a property of the exposed surface of the selected wafer (106) in response to the output signal of the wafer position detection system (124) when the selected wafer is in the measurement zone. The disclosed surface measurement system (100)may be used to gather real-time data concerning surface properties such as composition, roughness and epilayer thickness during multi-wafer semiconductor processing.

15 Claims, 2 Drawing Sheets

SEMICONDUCTOR SURFACE MEASUREMENT SYSTEM AND METHOD

This is a Non Provisional application filed under 35 USC 119(e) and claims priority of prior provisional, Ser. No. 60/034,258 of inventor Francis G. Celiii, filed Dec. 20, 1996.

TECHNICAL FIELD OF THE INVENTION

This invention relates generally to semiconductor processing systems and more particularly to a semiconductor surface measurement system and method.

BACKGROUND OF THE INVENTION

The use of spectroscopic ellipsometry and spectral reflectance to measure surface properties of a semiconductor wafer is well-known. Both of these methods involve the detection of light reflected from the surface of the wafer to determine the spectral characteristics of the light, such as intensity and polarization at various wavelengths. These measurements are usually taken in real-time during the performance of a process affecting surface properties, such as epitaxial growth. The spectral characteristics of the reflected light are compared to the spectral characteristics of known materials to determine the surface properties of the wafer such as composition, surface roughness and epilayer thickness.

In the mass production of integrated circuit chips, it is often desirable to produce a plurality of identical wafers. One step in the efficient production of such wafers involves simultaneous epitaxial growth on a plurality of wafers in a single reactor chamber. To accomplish this, the wafers are typically mounted around the perimeter of a flat wafer holder, which rotates the wafers around a vertical rotation axis during epitaxial growth to ensure an even distribution of the source material.

Although spectroscopic ellipsometry and spectral reflectance are well-suited for the measurement of surface properties for a single, stationary wafer, known spectroscopic measurement systems are not suitable for use with multiple-wafer epitaxial growth chambers, due to the constant motion of the wafers into and out of alignment with the measurement apparatus.

SUMMARY OF THE INVENTION

Therefore, a need has arisen for a semiconductor surface measurement system and method that overcome the disadvantages and deficiencies of the prior art.

A semiconductor surface measurement system is disclosed. In this system, a plurality of wafers, each having an exposed surface, are held by a wafer positioning system, which sequentially moves the wafers into a measurement zone. A wafer position detection system detects the position of a selected wafer, and generates an output signal indicating the position of the selected wafer. A surface measurement apparatus measures a property of the exposed surface of the selected wafer in response to the output signal of the wafer position detection system when the selected wafer is in the measurement zone.

In one embodiment, the surface measurement system detects the thickness of a layer during epitaxial growth on the exposed surface of the wafer.

A technical advantage of the present invention is that the semiconductor surface measurement system may be used to gather real-time data concerning surface properties such as composition and roughness during multi-wafer semiconductor processing. Another technical advantage is that measurements of surface properties may be taken from a plurality of moving wafers from the same surface region on each wafer. Another technical advantage is that the semiconductor surface measurement system may be used to measure layer thickness during epitaxial growth.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION OF THE INVENTION

Figure 1A:
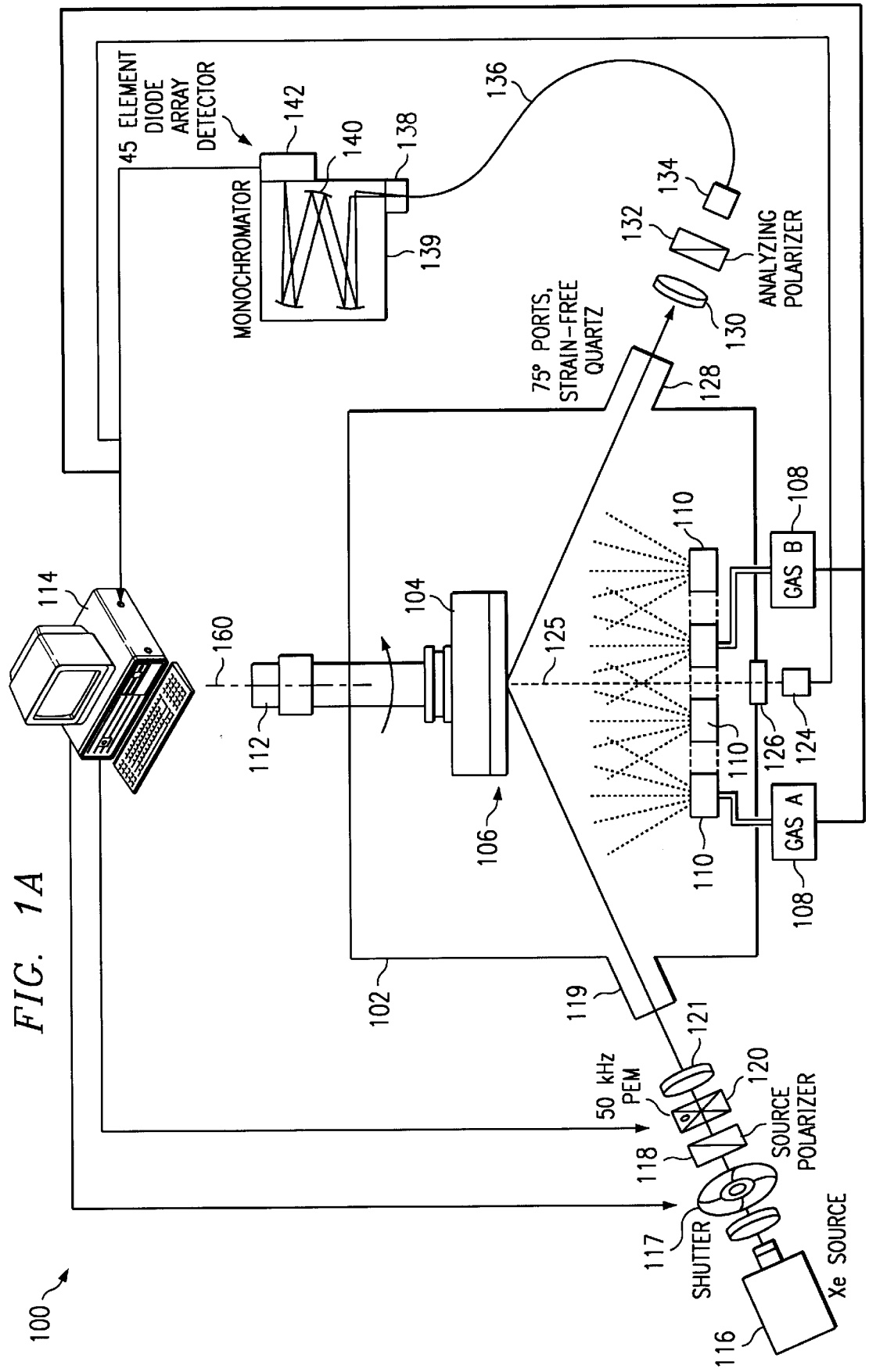
FIG. 1A is a simplified illustration of a metalorganic chemical vapor deposition system in accordance with the present invention.
Figure 1B:
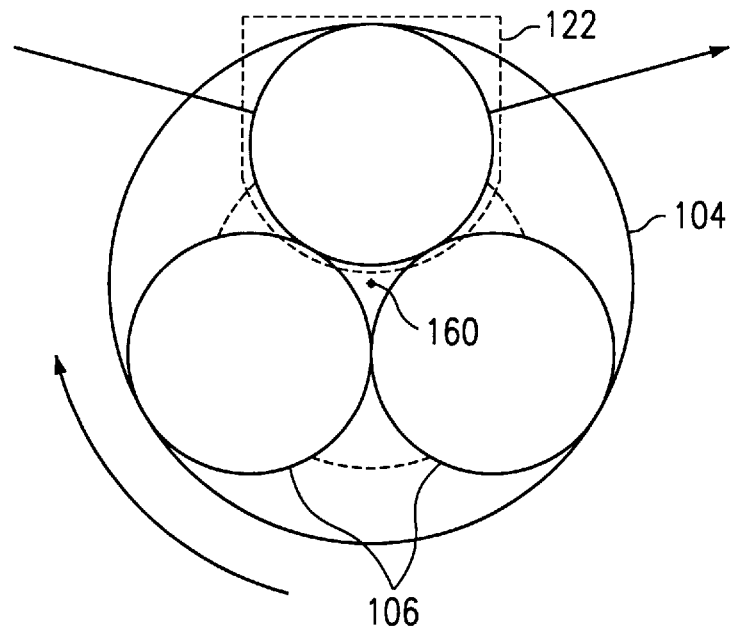
FIG. 1B is a bottom view of a wafer holder for the metalorganic chemical vapor deposition system.
Figure 2:
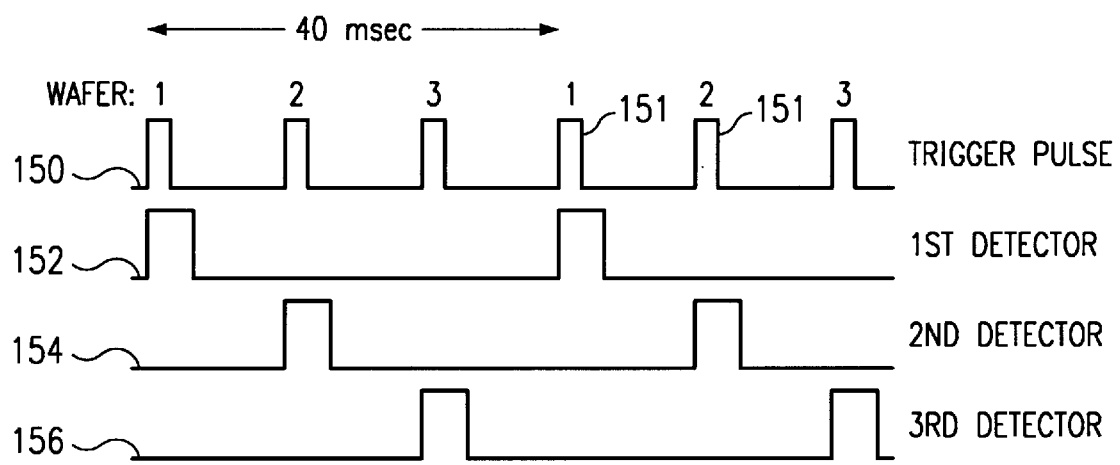
FIG. 2 is an exemplary timing diagram illustrating the operation of the metalorganic chemical vapor deposition system in accordance with the present invention.

The preferred embodiment of the present invention and its advantages are best understood by referring to FIGS. 1A, 1B and 2 of the drawings, like numerals being used for like and corresponding parts of the various drawings.

Referring to FIGS. 1A and 1B, a metalorganic chemical vapor deposition (MOCVD) system 100 in accordance with the invention is shown. MOCVD system 100 comprises a reactor chamber 102 in which a multi-wafer rotatable holder 104 holds a plurality of substrate wafers 106. During operation, reactor chamber 102 is evacuated to a pressure of approximately $10^{-2}$ Torr. Gas sources 108 provide a flow of gas to a plurality of annular, concentric showerheads 110. Gas molecules such as trimethylgallium are emitted from showerheads 110 and are deposited on the exposed surfaces of wafers 106. Showerheads 110 may, for example, provide source molecules of gallium, arsenic, phosphorus, indium and/or aluminum. During epitaxial growth, rotatable holder 104 is rotated around axis of rotation 160 at a constant rate, such as 1500 rpm, by a motor 112. A data processing and control system 114 operates valves or mass flow controllers (not shown) in gas sources 108 to begin and end epitaxial layer growth on wafers 106.

Epilayer growth on wafers 106 is monitored using spectroscopic ellipsometry. A light source 116, in this case a Xe lamp, emits unpolarized light. Data processing and control system 114 operates a shutter 117, which when closed serves to block the light from light source 116. The light from light source 116 is polarized by a source polarizer 118. The direction of polarization of the light is controlled by a photoelastic modulator (PEM) 120, which alternates the orientation of the polarized light between two perpendicular orientations, referred to as the s and p directions. PEM 120 alternates polarization at a constant frequency, in this case 50 kHz. The polarized beam of light from light source 116 is focused slightly by a lens 121 and directed toward wafers 106 through a window port 119 in reactor chamber 102.

A laser/photodiode combination 124 is used to determine the positions of wafers 106 relative to the polarized light beam from light source 116. Laser/photodiode combination 124 projects a laser beam 125 through a window port 126 in reactor chamber 102. Laser beam 125 is projected at an angle normal to the surfaces of wafers 106.

When laser beam 125 impinges on a wafer 106, the beam is reflected back to, and detected by, laser/photodiode combination 124. When no wafer is aligned with laser beam 125, no reflected light is detected by laser/photodiode combination 124. Laser/photodiode combination 124 is positioned so that the presence or absence of reflected light may be used to determine whether a wafer 106 is within a measurement zone 122. FIG. 1B shows the bottom view of the wafer holder 104. The wafer holder 104 rotates about axis 160 in the direction shown. As illustrated in FIG. 1B, the wafers are positioned offset the axis of rotation 160 and the rotation of the holder sequentially moves the wafers 106 through the measurement zone 122. Laser/photodiode combination 124 generates and sends an output signal to data processing and control system 114, which utilizes the output signal in a manner to be described below.

In an alternative embodiment, the laser and photodiode of laser/photodiode combination 124 are separated. Laser beam 125 is projected through a first window port and impinges on a wafer 106 in measurement zone 122 at an angle other than perpendicular or normal to the wafer surface. Laser beam 125 is reflected through a second window port and detected by the photodiode. Because this alternative embodiment requires an additional window port in reactor chamber 102, it is not the preferred embodiment. However, the positioning of showerheads 110 may prevent laser/photodiode combination 124 from being positioned as shown in FIG. 1A. In that case, the alternative embodiment described herein may be required.

When one of the wafers 106 is within measurement zone 122, the polarized light from light source 116 impinges on the growth surface of the wafer and is reflected through a window port 128 to a second focusing lens 130, which slightly refocuses the reflected light beam. An analyzing polarizer 132 transmits only a particular polarization component of the reflected light to a fiber coupler 134. The light received by fiber coupler 134 is transmitted via fiber-optic cable 136 and a second fiber coupler 138 to a monochromator 139.

Monochromator 139 spatially separates the light according to wavelength using a diffraction grating 140, in a manner well-known in the art of spectroscopic ellipsometry. The light is then directed toward a diode array detector 142, in which a linear array of photodiodes (not shown) detects the intensity of received light. In this example, diode array detector 142 comprises 45 photodiodes. Each photodiode receives light in a different wavelength band. Diode array detector 142 generates output signals indicating the intensity of light received by each photodiode. The output signals are received by data processing and control system 114. These output signals are generated continuously, but are only read by data processing and control system 114 at particular intervals, as will be explained more fully below.

Collectively, light source 116, shutter 117, source polarizer 118, PEM 120, lenses 121 and 130, analyzing polarizer 132, fiber couplers 134 and 138, fiber optic cable 136, monochromator 139, diode array detector 142 and data processing and control system 114 constitute a surface measurement system using spectroscopic ellipsometry. From the description contained herein, it will be apparent to those skilled in the art that any other surface measurement technique that involves the analysis of reflected light from the surfaces of wafers 106, such as spectral reflectance, may alternatively be used in connection with MOCVD system 100 without departing from the spirit and scope of the invention.

Referring to FIG. 2, a timing diagram illustrating an exemplary sequence of events followed by MOCVD system 100 is shown. Waveform 150 represents the output signal from laser/photodiode combination 124. As each wafer 106 enters the measurement zone 122, a trigger pulse 151 is generated. In this illustration, each trigger pulse 151 is numbered according to the wafer which gives rise to the pulse. Thus, with wafer holder 104 holding three wafers and rotating at a rate of 1500 rpm, three trigger pulses are produced every 40 milliseconds, with every third trigger pulse 151 being triggered by the same wafer.

Waveform 150 is received by data processing and control system 114, and is used to read data sequentially from the photodiodes in diode array detector 142. In the example illustrated in FIG. 2, diode array detector 142 comprises only three photodiodes. As shown by waveform 152, data processing and control system 114 reads from the first photodiode for a short, predetermined time interval starting with every third trigger pulse 151. On the following trigger pulse, data processing and control system 114 reads from the second photodiode, as illustrated by waveform 154. Then on the following trigger pulse, data processing and control system 114 reads from the third photodiode, as illustrated by waveform 156.

It will be recognized that, in the general case where wafer holder 104 holds n wafers, and diode array detector 142 comprises N photodiodes, a sample spectrum comprising N/n data points will be gathered for each wafer 106 over the span of N/n rotations of wafer holder 104. Thus, in the example illustrated in FIGS. 1A and 1B, where n=3 and N=45, a sample spectrum comprising 15 data points will be collected for each wafer for every 15 rotations of wafer holder 104, or every 600 milliseconds.

Alternatively, in the case where a limited number of wavelengths are of interest in making a measurement, data may be collected from a few selected photodiodes in diode array detector 142. In this case, a sample spectrum may be collected in less time than is required to collect a full spectrum.

It will also be recognized that laser/photodiode combination 124 may be positioned so that a trigger pulse 151 is not generated precisely when a wafer 106 is entering measurement zone 122. Instead, the trigger pulse 151 may be offset by some delay interval from the desired measurement time. This delay interval is determined by the rotation rate of wafer holder 104 as well as the positioning of laser/photodiode combination 124. In this case, data processing and control system 114 may be programmed to wait for the appropriate interval following each trigger pulse 151 before reading the output signal from the appropriate photodiode in diode array detector 142.

When a spectrum of intensity data has been collected for a wafer 106, data processing and control system 114 may conduct a real-time comparison of measured spectral characteristics to a set of stored spectral characteristics to determine properties such as the thickness and composition of the epilayer being deposited on the wafer 106. This comparison is conducted in a manner well known to those skilled in the art of spectroscopic ellipsometry. For example, the shape of a sample spectrum may be compared to the known spectral shapes of the substrate wafer and the growth material to determine the thickness of the growth layer.

According to the present invention, a separate spectrum is acquired for each wafer 106, thus allowing separate and independent measurements of the epilayer growth on each wafer. Moreover, with detector readings being triggered according to wafer position during rotation, multiple readings may be taken from the same surface region on a wafer despite the intervening rotations of the wafer holder, thus providing consistency in surface data collection over an extended period of time.

It will be apparent to those skilled and the art that the invention disclosed herein, although described in the context of MOCVD growth technology, may be used with other multi-wafer layer growth technologies, such as molecular beam epitaxy (MBE) and chemical vapor deposition (CVD). Furthermore, the disclosed surface measurement technique may be used in connection with any other surface-affecting process conducted simultaneously on a plurality of semiconductor wafers. Such processes may include, for example, plasma etching and ion implantation.

While the invention has been particularly shown and described by the foregoing detailed description, it will be understood by those skilled in the art that various other changes in form and detail may be made without departing from the spirit and scope of the invention.

What is claimed is:

1. A semiconductor surface measurement system comprising:
    a plurality of wafers, each wafer having an exposed surface;
    a wafer positioning system with a rotatable wafer holder operable to hold the wafers offset a rotation axis and rotate the wafers about the rotation axis to sequentially move the wafers through a measurement zone;
    a wafer position detection system operable to detect a position of a selected one of the wafers, and to generate an output signal indicating the position of the selected wafer; and
    a surface measurement apparatus operable to measure, in response to the output signal of the wafer position detection system, a property of the exposed surface of the selected wafer when the selected wafer is in the measurement zone.

2. The semiconductor surface measurement system of claim 1, wherein the surface measurement apparatus comprises a spectroscopic ellipsometer.

3. The semiconductor surface measurement system of claim 1, wherein the surface measurement apparatus comprises:
    a light source operable to project light onto the exposed surface of the selected wafer;
    a monochromator operable to spatially light reflected from the growth layer of the selected wafer into a plurality of wavelength bands; and
    a plurality of detectors, each detector being operable to receive from the monochromator a selected one of the wavelength bands, to detect an intensity of the selected wavelength band, and to generate an output signal in the response to the intensity of the selected wavelength band.

4. The semiconductor surface measurement system of claim 3, wherein the surface measurement apparatus further comprises a data processor operable to receive the output signals of the detectors and to calculate a layer thickness in response to the output signals of the detectors.

5. The semiconductor surface measurement system of claim 1, wherein the wafer position detection system comprises:
    a light source operable to project a light onto the selected wafer; and
    a detector operable to detect a reflection of the light beam from the selected wafer.

6. The semiconductor surface measurement system of claim 5, wherein the light source comprises a laser.

7. A wafer growth system comprising:
    a plurality of wafers, each wafer having a growth surface;
    a wafer positioning system with a rotatable wafer holder operable to hold the wafers offset a rotation axis and rotate the wafers about the rotation axis to sequentially move the wafers through a measurement zone;
    a evacuated growth chamber;
    a growth material source connected to the growth chamber, the growth material source being operable to deposit growth material on the growth surfaces of the respective wafers;
    a wafer position detection system operable to detect a position of a selected one of the wafers, and to generate an output signal indicating the position of the selected wafer; and
    a layer measurement apparatus operable to measure a property of a growth layer on the growth surface of the selected wafer in response to the output signal of the wafer position detection system when the selected wafer is in the measurement zone.

8. The wafer growth system of claim 7, wherein the wafer position detection system comprises:
    a light source operable to project a light beam onto the selected wafer; and
    a detector operable to detect a reflection of the light beam from the selected wafer.

9. The wafer growth system of claim 8, wherein the light source comprises a laser.

10. A method for epitaxial layer growth measurement, comprising the steps of:
    mounting a plurality of wafers offset a rotational axis on a sample holder;
    rotating the sample holder about the rotational axis;
    projecting light onto a growth surface of a first wafer when the first wafer is in a measurement zone;

detecting an intensity of light reflected from the growth surface of the first wafer;

moving the first wafer out of the measurement zone;

moving a second wafer into the measurement zone;

projecting light onto a growth surface of the second wafer when the second wafer is in the measurement zone; and detecting an intensity of light reflected from the growth surface of the second wafer.

11. The method of claim 10, further comprising the step of detecting the presence of the second wafer in the measurement zone.

12. The method of claim 10, wherein the step of detecting the intensity of the light reflected from the growth system of the first wafer comprises the step of detecting a spectral shape of the light reflected from the growth surface of the first wafer.

13. The method of claim 12 further comprising the step of comparing the spectral shape of the light reflected from the growth surface of the first wafer to a reference spectrial shape.

14. The method of claim 12, further comprising the step of comparing the spectral shape of the light reflected from the growth surface of the first wafer to a reference growth material spectral shape.

15. The method of claim 10, further comprising the steps of:

detecting the presence of the first wafer in the measurement zone;

projecting light onto the growth surface of the first wafer when the first wafer is in the measurement zone; and detecting the intensity of light reflected from the growth surface of the first wafer.

\* \* \* \* \*